United States Patent Office 3,542,879
Patented Nov. 24, 1970

3,542,879
PREPARATION OF ANHYDROUS
MONOMERIC GLYOXAL
Andrew Harper Dinwoodie, Dalry, and George Gourlay, Stevenston, Scotland, assignors to Imperial Chemical Industries Limited, London, England, a corporation of Great Britain
No Drawing. Filed Apr. 15, 1968, Ser. No. 721,147
Int. Cl. C07c 45/00
U.S. Cl. 260—601  12 Claims

ABSTRACT OF THE DISCLOSURE

Anhydrous monomeric glyoxal is prepared by heating hydrated glyoxal suspended in a silicone fluid at a temperature in the range 120–185° C. This process gives a high yield without any charring.

---

This invention relates to a process for the preparation of anhydrous monomeric glyoxal and to monomeric glyoxal produced thereby. Glyoxal, in hydrated form, is usually partially polymerised and relatively unreactive and it is desirable to prepare the anhydrous monomeric form for use in the formation of glyoxal polymers and copolymers and as an intermediate in chemical synthesis.

Anhydrous monomeric glyoxal has previously been prepared by heating hydrated glyoxal in presence of a dehydrating agent, or by heating a suspension or solution of the hydrated glyoxal in a liquid to evaporate monomeric glyoxal. These prior art methods resulted in excessive charring and reaction of the hydrated glyoxal and the yields of monomer were consequently reduced.

It is an object of the present invention to provide an improved method of producing anhydrous monomeric glyoxal which gives higher yields of monomeric glyoxal than those methods previously used.

In accordance with this invention anhydrous monomeric glyoxal is prepared by heating hydrated glyoxal suspended in a silicone fluid at a temperature in the range 120–185° C. to evaporate a mixture comprising glyoxal and water vapour, and removing the water from the vapour mixture. This process gives monomeric glyoxal in high yield without charring of the hydrated glyoxal. The superiority of silicone fluid as a heat exchange medium for the process is believed to be due to its high surface activity and viscosity which tend to prevent the suspended glyoxal particles forming large agglomerates, thereby enhancing the efficiency of heat transfer and depolymerisation and permitting lower reaction temperatures.

The water may be removed from the vapour by condensing it in an apparatus such as a Dean and Stark apparatus and the vapour may be further dried by drying agents such as a molecular sieve of which a convenient example is the "Linde" molecular sieve No. 5A and/or by dehydrating agents such as phosphorus pentoxide. The condensed water will contain some disssolved glyoxal which can be recovered by concentrating the solution and re-using it in the process.

The heating process is preferably carried out at reduced pressure which, when water is being removed by condensation, prevents excessive glyoxal being condensed with the water. A pressure of 10 to 30 mm. Hg is preferred. The preferred heating temperature is in the range 140–160° C. The silicone fluid should preferably be one which has a boiling point above 200° C. at 200 mm. Hg and should also preferably have a viscosity of not less than 10 centistokes at 120° C. Suitable silicone fluids include dimethyl polysiloxanes and methylphenyl polysiloxanes.

The hydrated glyoxal may be in the form of an aqueous solution but it is preferably in the form of a finely divided solid having, for example, an average particle diameter of 1 to 100 microns.

The anhydrous monomeric glyoxal is a greenish-yellow liquid at ordinary temperatures. It has a melting point of 15° C. and a boiling point of 50.4° C. at atmospheric pressure. The monomeric vapour produced in the invention may, if desired, be used as such in a further reaction or, if it is to be stored, it may be condensed by cooling, a convenient cooling agent being solid carbon dioxide at −78° C. The liquid monomer may be collected and stored as such or it may be dissolved in a solvent such as diethyl ether, petroleum ether, benzene, carbon tetrachloride or chloroform.

The process may conveniently be carried out as a continuous process by arranging a continuous feed of hydrated glyoxal since the silicon fluid is unaffected by the process.

The invention is further illustrated by the following examples in which all parts and percentages are by weight.

EXAMPLE 1

The apparatus used consisted of a 1 litre round-bottomed flask fitted with a stirrer and thermometer. The flask was connected to a rouble surface condenser immediately beneath which was a 100 ml. flask in the manner of a Dean and Stark apparatus. The double surface condenser was connected to a column filled with "Linde" 5A molecular sieve and then to a flask containing phosphorus pentoxide. A side arm connected to the flask led via a series of traps cooled to −78° C. to a vacuum pump.

50 parts of glyoxal monohydrate in the form of a fine white powder having particles ranging in size from 1 to 100 microns were placed in the flask and 250 parts of a methylphenyl silicone fluid, commercially available as Silicone Fluid F190 manufactured by Imperial Chemical Industries Limited, having a viscosity of 1000 centistokes at 20° C. and 31 centistokes at 120° C., were added. The mixture was heated with vigorous stirring at a pressure of 20 mm. Hg.

At 120° C. the green-yellow vapours of glyoxal monomer appeared and were collected at −78° C. as a solid in the traps. The temperature of the fluid in the flask was maintained at 145–160° C. for 2 hours.

The monomer obtained was weighed. The amount of glyoxal present as the hydrate in the aqueous distillate and the amount of glyoxal left in the reaction flask were determined by precipitation of the glyoxal as the Schiff base with a known amount of cyclohexylamine and estimation of the unreacted cyclohexylamine with standard acid.

These results showed that 76% of the hydrated glyoxal had been converted to monomer and a yield of 92% monomeric glyoxal had been obtained.

EXAMPLE 2

Using the apparatus described in Example 1, 50 parts of glyoxal monohydrate in the form of a fine white powder having a particle size ranging from 1 to 100 microns and 250 parts of a dimethyl silicone fluid, having a viscosity of 300 centistokes at 25° C. and of 85 centistokes at 120° C., commercially available as Imperial Chemical Industries Limited Silicone Fluid F111/300, were placed in the reaction flask. The mixture was heated with vigorous stirring at a pressure of 20 mm. and maintained at a temperature of 140° C.–160° C. for 2 hours, during which time glyoxal monomer was collected as a solid at −78° C.

A mass balance was performed as described in Example 1. The results obtained showed a conversion of 75% and a yield of 96% monomeric glyoxal.

EXAMPLE 3

Using the apparatus described in Example 1, 250 parts of the same dimethyl silicone fluid as used in Example 2 were placed in the reaction flask. A solution of 50 parts of glyoxal monohydrate in 75 parts of distilled water was added with vigorous stirring. The mixture was heated with vigorous stirring at a pressure of 20 mm. The fluid in the flask was maintained at 80° C. until most of the excess water had distilled off and then the temperature was raised to 150° C. and maintained thereat for 2 hours.

The glyoxal monomer was collected as the solid at −78° C. and weighed.

A mass balance was performed as described in Example 1. The results obtained showed a conversion of 65% and a yield of 85% monomeric glyoxal.

What we claim is:

1. A process for the preparation of anhydrous monomeric glyoxal comprising heating hydrated glyoxal suspended in a silicone fluid selected from the group consisting of dimethylpolysiloxanes and dimethylphenylsiloxanes at a temperature in the range of 120–185° C. to evaporate a mixture comprising glyoxal and water vapour and removing the water from the vapour mixture.

2. A process as claimed in claim 1 wherein the water vapor is removed by condensation.

3. A process as claimed in claim 1 wherein the vapour is dried by a molecular sieve or a dehydrating agent.

4. A process as claimed in claim 1 carried out at reduced pressure.

5. A process as claimed in claim 4 wherein the pressure is in the range 10 to 30 mm. Hg.

6. A process as claimed in claim 1 wherein the temperature is in the range 140–160° C.

7. A process as claimed in claim 1 wherein the silicone fluid is one having a boiling point above 200° C. at 200 mm. Hg.

8. A process as claimed in claim 1 wherein the silicone fluid is one having a viscosity of not less than 10 centistokes at 120° C.

9. A process as claimed in claim 1 wherein the hydrated glyoxal is in the form of a finely divided solid.

10. A process as claimed in claim 9 wherein the hydrated glyoxal has an average particle diameter of 1 to 100 microns.

11. A process as claimed in claim 1 whenever carried out as a continuous process using a continuous feed of hydrated glyoxal.

12. A process as claimed in claim 1 wherein the monomeric glyoxal vapour is condensed to a liquid.

References Cited

UNITED STATES PATENTS 2,463,030    3/1949    Guest et al. _____ 260—601

FOREIGN PATENTS 1,021,937    3/1966    Great Britain.

OTHER REFERENCES

Union Carbide Chemicals, General Chemistry of Glyoxal, 1965.

LEON ZITVER, Primary Examiner

R. H. LILES, Assistant Examiner